(12) United States Patent
Juga et al.

(10) Patent No.: US 9,095,168 B2
(45) Date of Patent: Aug. 4, 2015

(54) ACIDIFIED MILK BEVERAGE POWDER AND METHOD FOR PRODUCING THE SAME

(75) Inventors: Birke Juga, Bad Windsheim (DE); Rebecca Lian Hwee Peng, Beijing (CN)

(73) Assignee: Nestec S.A., Vevey (CH)

( * ) Notice: Subject to any disclaimer, the term of this patent is extended or adjusted under 35 U.S.C. 154(b) by 163 days.

(21) Appl. No.: 13/497,406

(22) PCT Filed: Sep. 22, 2010

(86) PCT No.: PCT/EP2010/063940
§ 371 (c)(1),
(2), (4) Date: May 30, 2012

(87) PCT Pub. No.: WO2011/036163
PCT Pub. Date: Mar. 31, 2011

(65) Prior Publication Data
US 2012/0321745 A1 Dec. 20, 2012

(30) Foreign Application Priority Data
Sep. 22, 2009 (CN) .......................... 2009 1 0177791

(51) Int. Cl.
| | | |
|---|---|---|
| *A23C 9/00* | (2006.01) | |
| *A23C 9/154* | (2006.01) | |
| *A23C 9/156* | (2006.01) | |
| *A23C 9/16* | (2006.01) | |
| *A23L 2/39* | (2006.01) | |
| *A23L 1/0534* | (2006.01) | |
| *A23L 2/52* | (2006.01) | |
| *A23L 2/60* | (2006.01) | |
| *A23L 2/66* | (2006.01) | |
| *A23L 2/68* | (2006.01) | |

(52) U.S. Cl.
CPC . *A23L 2/39* (2013.01); *A23C 9/156* (2013.01); *A23C 9/1542* (2013.01); *A23C 9/1565* (2013.01); *A23C 9/16* (2013.01); *A23L 1/0534* (2013.01); *A23L 2/52* (2013.01); *A23L 2/60* (2013.01); *A23L 2/66* (2013.01); *A23L 2/68* (2013.01); *A23V 2002/00* (2013.01)

(58) Field of Classification Search
CPC ........ A23C 9/156; A23C 9/1565; A23C 9/16; A23C 9/18; A23C 1/00
USPC ................. 426/588, 599, 330.2, 330.3, 330.5
See application file for complete search history.

(56) References Cited

U.S. PATENT DOCUMENTS

| | | | | |
|---|---|---|---|---|
| 4,078,092 | A | * | 3/1978 | Nishiyama .................... 426/584 |
| 4,264,638 | A | * | 4/1981 | Sirett et al. .................... 426/580 |
| 2005/0266134 | A1 | * | 12/2005 | Nagao et al. .................. 426/534 |
| 2008/0152777 | A1 | * | 6/2008 | Cobos ........................... 426/588 |

FOREIGN PATENT DOCUMENTS

| | | |
|---|---|---|
| CA | 1066121 | 11/1979 |
| WO | 9629880 | 10/1996 |

OTHER PUBLICATIONS

Baiqiao et al., "The stabilization mechanism of acidified mild drinks induced by carboxymethylcellulose," vol. 87, Oct. 26, 2007, pp. 287-300—XP002612034.

Lueck H., et al., "Fruit juice-flavoured milk powder," South-African Journal of Dairy Technology, vol. 6, No. 2, Jan. 1, 1974, pp. 117-121—XP009141697.

* cited by examiner

*Primary Examiner* — D. Lawrence Tarazano
*Assistant Examiner* — Juliya Kravets
(74) *Attorney, Agent, or Firm* — K&L Gates LLP

(57) ABSTRACT

The present invention relates to an acidified milk beverage powder and method for producing such an acidified milk beverage powder. More specifically, the present invention provides a powdered composition which can be added to water with minimal mixing to produce an acidified fruit beverage containing milk and having a smooth texture. Said powder comprising: i) 20-40 wt % fruit juice powder; ii) 50-70 wt % granular sugar; iii) 1-2 wt % organic acid granules; iv) 4-10 wt % milk powder; and v) 3-4 wt % carboxymethylcellulose powder composed of particles, wherein said particles have a diameter of 0.5 mm or less, preferably of 0.1 mm or less. The present invention also provides a process for producing said powder for the preparation of an acidified milk beverage, comprising steps of: dry blending granular sugar with carboxymethylcellulose powder, and mixing a milk powder, a fruit juice powder and granular organic acid into the blend.

15 Claims, No Drawings

ACIDIFIED MILK BEVERAGE POWDER AND METHOD FOR PRODUCING THE SAME

CROSS REFERENCE TO RELATED APPLICATIONS

The present application is a National Stage of International Application No. PCT/EP2010/063940, filed on Sep. 22, 2010, which claims priority to Chinese Patent Application No. 200910177791.4, filed on Sep. 22, 2009, the entire contents of which are being incorporated herein by reference.

TECHNICAL FIELD

The present invention relates to an acidified milk beverage powder and method for producing such an acidified milk beverage powder. More specifically, the present invention provides a powdered composition which can be added to water with minimal mixing to produce an acidified fruit beverage containing milk and having a smooth texture.

BACKGROUND

Attempts have been made to provide powdered compositions suitable for mixing with water, water+milk powder or milk for the manufacture of non-gelled acidified, milk containing product drinks. For example, US2008/0152777A1 provided a powdered composition that, upon mixing with water or milk, formed a non-gelled, acidified, milk-product drink without curdling of the milk protein. The composition contained 70-85% sugar, 0.15-0.4% artificial sweeteners, 7.15% citric acid, 0.6-1.6% buffering or acid bite reducing agent, 3.5-8% guar gum, 2-15% calcium fortification agent, and optional milk powder, emulsifiers, flavorants, colorants, vitamins, minerals, prebiotics, probiotic or fiber. The powdered composition was prepared by dry-blending sugars, citric acid, acid bit reducing agent, guar gum in a first step to homogeneously distribute guar gum. The remaining ingredients were added for dry-blending in a second stage. The beverage mix was prepared by mixing powder into water or milk and gentle stirring for 45 seconds to form a beverage with a pH less than 4.6. It was reported that guar gum was effective to prevent protein curdling, although it was not reported why this effect was present. Addition of fruit juice solids was reported in examples but not part of the claims.

Another patent, U.S. Pat. No. 4,530,850 provided a powdered composition that, upon mixing with milk, formed a non-gelled, acidified, milk-product drink without curdling of the milk proteins. The powdered composition contained about 1 to about 9 percent of an edible acid, about 0.5 to about 1.9 percent of an instant cold-water soluble gelatin, about 1 to about 10 percent of an edible natural or modified polysaccharide gum, about 20 to about 90 percent sweetening agents, and an effective amount of flavoring and coloring agents. The beverage was prepared by vigorously mixing (e.g. in a blender at high speed for 10 seconds or in a shaker for an unlisted time) the powdered composition into milk. It was reported that the gelatin included in the powder became attached to the casein in the milk, thereby stabilized the milk protein at lower pH; the gum was reportedly used to improve the viscosity and texture of the final beverage product. Attempts to reproduce the work reported in US2008/0152777A1 and U.S. Pat. No. 4,530,850 by the present inventors were generally unsuccessful. It is well known and has been reported by various patents, for example U.S. Pat. No. 6,652,896, that Na-CMC is effective to prevent milk protein curdling in liquid ready-to-drink beverages, when having a certain processing sequence and allowing Na-CMC and milk protein to establish in liquid conditions. No reports or positive results have been reported up to now, using Na-CMC in powdered beverages. Accordingly, there remains a need to find a suitable gum system for powdered beverage mixes containing milk, to provide a milk-containing beverage drink without protein curdling, having a smooth texture upon reconstitution with simple devices, e.g. a spoon.

SUMMARY OF THE INVENTION

At the time the consumer adds water to an acid milk powder to form a drinkable product, milk proteins coagulate by the acid compound present in the powder very rapidly. This is the technical problem to be solved (and which does not exist in currently known products on the market which are all in liquid and not powder form). Hence, the aim of the current invention is to provide an acidified milk beverage powder where upon reconstitution with a liquid, the milk proteins are not coagulated by the acid which is present in the powder mix as well.

The invention related to an acidified milk beverage powder and method for producing such acidified milk beverage powder. The present invention provides a powdered composition which can be added to water or a milk product with minimal mixing (e.g. gentle hand stirring by spoon) to produce an instant acidified milk beverage having a smooth texture.

The powdered compositions of the present invention contains sugar, concentrated fruit juices, skimmed or non-skimmed milk powder, maltodextrin, Na-Carboxymethylcellulose, and optional: acid bite reducing agents or buffering agents, flavorants, colorants, calcium fortification agent, vitamins, minerals, emulsifiers, prebiotics, probiotics, and fibers; the powdered composition of the present invention do not require and preferably do not contain any further hydrocolloids like gelatin, guar gum or thereof. The powdered composition, when added to a liquid (e.g. water, whole milk, skim milk, reconstituted skim milk powders and the like), only requires minimal mixing to obtain the desired acidified milk beverage. Preferably the milk and milk powders are pasteurized and even more preferably pasteurized using an ultra high temperature process. Specifically, the powder composition of the present invention comprises: i) 20-40 wt % fruit juice powder; ii) 50-70 wt % granular sugar; iii) 1-2 wt % organic acid granules; iv) 4-10 wt % milk powder; and v) 3-4 wt % carboxymethylcellulose powder composed of particles, wherein said particles have a diameter of 0.5 mm or less, preferably of 0.1 mm or less.

In order to solve the technical problem, we developed a powder mix wherein the CMC particles have a very fine diameter, so that the time for the CMC particles to swell when water is added to the powder mix, is considerably reduced, and it is very rapidly active to prevent flocculation. This is the first effect. The second effect, the acid particles have a big diameter, so that the swelling/dissolution of the acid when water is added to the mix, is prolonged, which therefore reduces the immediate effect of acid onto the proteins.

The two effects above are synergetic to prevent flocculation. But on top of this, the concentrations of each key ingredient is managed such that the flocculation effect is even reduced, while guaranteeing a proper texture and taste of the final product, close to what is achieved with a liquid product.

The powdered composition of the present invention can be reconstituted with a liquid (water, milk powder+water, ready-to-drink milk) and stirred with a spoon with minimal mixture to provide an acidified milk beverage in which the precipitation of casein proteins is minimized. The powdered composition is admixed dry by managing the order of addition of ingredients and following a two step mixing process: 1) dry blending granular sugar with carboxymethylcellulose powder, and 2) mixing a milk powder, a fruit juice powder and granular organic acid into the blend. No liquids are used in the preparation of the powdered compositions of the present invention. The resulting powdered composition has good dispersibility and hydration when added to the liquid. No agglomeration of the powder or homogenization within reconstitution of the powder in liquid is required. Stabilizers such as carrageenans, pectin, gelatin or other hydrocolloids are not needed and preferably are not used. Equally, acid bite reducing agents or buffering agents are not needed.

DETAILED DESCRIPTION

The invention relates to instant acidified beverages containing milk and methods for producing such instant acidified milk beverages. The present invention provides a powdered composition which can be added to a milk product with minimal mixing to produce an instant acidified beverage having a smooth texture. The present invention also provides a method for preparing the powdered composition.

The powdered compositions of the present invention contains sugar, concentrated fruit juices, skimmed milk powder, maltodextrin, Na-Carboxymethylcellulose, and optional: acid bite reducing agents or buffering agents, flavorants, colorants, calcium fortification agent, vitamins, minerals, emulsifiers, prebiotics, probiotics, fibers; the powdered composition of the present invention do not require and preferably do not contain any further hydrocolloids like gelatin, guar gum or thereof. The powdered composition, when added to a liquid (e.g. water, whole milk, skim milk, reconstituted skim milk powders and the like), only requires minimal mixing to obtain the desired acidified milk beverage. Preferably the milk and milk powders are pasteurized and even more preferably pasteurized using an ultra high temperature process.

Sucrose particle size is preferably uniform to avoid demixing problems in a dry mix. Particle size is preferably 0.1-1 mm and more preferably 0.3-0.8 mm. Powdered sugar enhances hygroscopicity thus leads to water uptake within shelf-life and is not preferred. Granulated sucrose between 1-2 mm or bigger, needs in cold conditions too much time and reconstitution cannot be guaranteed to be ready within 20-30 seconds. Secondly, too big sugar crystals might also lead to demixing and bad distribution of gum and other ingredients which in case of gum might lead to difficulties in solubilization of dry mix. In cases floating powder pieces of 2-5 mm can be detected which might dissolve within time but show unpleasant look and might be reason for protein flocculation if floating pieces are especially sugar with gum (thus not enough gum in system to protect protein). Result: choosing sucrose of 0.3-0.8 mm avoids difficulties of rehydration time and bad solubility.

The organic acid may be citric acid, lactic acid, malic acid, tartaric acid, and/or any combinations thereof. When citric acid is used, it is preferably a Citric Acid Anhydrous Type E330 ($C_6H_8O_7$). Crystallized water in citric acid (like citric acid monohydrate ($C_6H_8O_7 \cdot H_2O$) might release water within shelf-life and effect the protein when powder mix is stored for several month (Total shelf-life of powder mix is given with 12-15 months). This effect can be seen but does not occur always, thus it is a factor which is preferred to be avoided.

As to the size of the organic acid particle, explanation is made taking citric acid as an example. Big citric acid crystals need stirring for a longer time to fully dissolve. If this time is not kept, the distribution is not fully uniform, leaving "pieces" of citric acid being not fully dissolved which then dissolve slowly without stirring causing in its surrounding a high "acidic" environment and might lead to flocculation of protein as Na-CMC can protect, but only to a certain extend. Secondly, if particle size of citric acid is too small, it dissolved so fast that Na-CMC has no time to coated and protect the present protein in time. Thus, minutes later, clear protein curdling can be detected visually and taste wise (enhanced grainy texture). Best particles size is thus ranging from 0.7-0.2 mm and preferably 0.7-0.4 mm.

For purpose of this invention, "minimal mixing" is intended to mean hand mixing device such as a spoon; blenders, mechanical mixing devices (e.g. rotor mixer operated by hand or electrical powder, shaker devices, and the like) are specifically not required or included in the definition of minimal mixing. Of course, as one skilled in the art will understand, the requirement that only "minimal mixing" is required to obtain the desired acidified milk containing beverage does not mean that the consumer cannot use more vigorous mixing conditions, but only that such more vigorous mixing conditions or equipment are not needed (or desired). Generally, a homogenous liquid beverage is obtained by such minimal mixing (e.g., hand mixing with a spoon) within about 40 seconds or less, and preferably within 30 seconds or less. The solubilization time depends on the temperature of milk or water used, as colder liquid extend the time of sugar solubility.

The powdered composition of the present invention is prepared by the following steps:

In the first step, dry blending granular sugar, having a particle size of 0.1-1 mm and more preferably between 0.3-0.8 mm, and Na-Carboxymethylcellulose, having a particle size of 0.5 mm or less, preferably of 0.1 mm or less and having a high rehydration capacity. Homogeneous distribution of such is highly recommended to avoid lump formation when added to water and to assure good and fast re-hydration of Na-CMC in order to protect the protein. The recommended ration of sugar to Na-CMC is 15:1 or more preferably 20:1. Mixing time should exceed 5 min before adding further ingredients.

In the second step, all ingredients except granular acid can be added mixing for another 5 min. Organic acids, such as malic acid, or more preferably citric acid is added in final mixing stage and mixed until homogeneously distributed which might take up to 2 min mixing time. The particle size of used acid is ranging between 0.2 mm to 0.7 mm, more preferably between 0.4 mm to 0.7 mm. Mixing time is related to used batch size. In present invention a typical batch size is referring to 1 kg complete mix. The composition is made of 50-60 wt % sucrose, 20-40 wt % fruit juice powders, 1-2 wt % citric acid, 0-5 wt % Non-dairy creamer having no protein, 0-1.5 wt % clouding agent, 3-4 wt % Na-CMC and 4-10 wt % milk powder, preferably 4-5 wt %. Colors, flavors, vitamins and minerals as well as buffering or acid bite reducing agents such as K-Citrate can be added upon desired and regulatory level.

Based on the above method, fruit-flavor milk beverage powders as shown in Table 1 to 3 are prepared (Example 1 to 3).

TABLE 1

Example 1: Orange beverage powder, 5% Juice and 5% Milk upon reconstitution

| | |
|---|---|
| Sugar | 61.3 |
| Fruit Powder | 20 |

TABLE 1-continued

Example 1: Orange beverage powder, 5%
Juice and 5% Milk upon reconstitution

| | |
|---|---|
| Na-CMC | 4 |
| SiO$_2$ | 0.3 |
| Flavors | 1 |
| Colors | 0.4 |
| Citric Acid | 1.7 |
| Non-Dairy Creamer | 5 |
| MSK | 5 |
| Vit. & Mineral Fort. | 1.3 |

TABLE 2

Example 2: Orange beverage powder, 5%
Juice and 10% Milk upon reconstitution

| | |
|---|---|
| Sugar | 59 |
| Fruit Powder | 20 |
| Na-CMC | 4 |
| TCP | 0.6 |
| Flavors | 1 |
| Colors | 0.4 |
| Citric Acid | 1.6 |
| Non-Dairy Creamer | 4 |
| MSK | 9.4 |

TABLE 3

Example 3: Pear/Lemon beverage powder, 10%
Juice and 5% Milk upon reconstitution

| | |
|---|---|
| Sugar | 52 |
| Fruit Powder | 35 |
| Na-CMC | 3.3 |
| TCP | 0.5 |
| Flavors | 0.85 |
| Colors | 0.35 |
| Citric Acid | 1.4 |
| Clouding Agent | 1.4 |
| MSK | 4.2 |
| Vit. & Mineral Fort. | 1 |

The above obtained powder was mixed with certain amount of water under gentle stirring to provide a reconstituted acidified milk beverage. After 10 minutes or even more, no flocculation was observed. The beverage gave good appearance. In addition, an evaluation of smooth texture can be given by tasting such beverage.

Additionally, comparison tests were made where Na-CMC of Example 1 was replaced with Xanthan gum, Guar gum, and Na-CMC having particle size that is out of the range as claimed by the present invention, respectively. The obtained beverage powder was reconstituted with water to provide beverage solution. Results of the comparison tests are shown in Table 4.

TABLE 4

Comparison Tests

| | Type of Gum | Used Gum Dosage | Particle size | Stirring Time (powder + water) | Flocculation, min after stirring |
|---|---|---|---|---|---|
| Example 1 | Na-CMC | 3.30% | <0.1 mm | 30 sec | No, >10 min |
| Comparison Example 1 | Na-CMC | 3.30% | 1-2 mm | 30 sec | Yes, 1-2 min |
| Comparison Example 2 | Xanthan Gum | 3.30% | <0.85 mm | 30 sec | Yes, 1-2 min |
| Comparison Example 3 | Guar Gum | 2.00% | <0.1 mm | 30 sec | Yes, 1-2 min |

It can be seen from Table 4 that if the particle size of Na-CMC is too big, the flocculation of protein would occur during the reconstitution of the powder. In addition, when Na-CMC is replaced by Xanthan gum or Guar gum, the flocculation would occur after 1 to 2 minutes of stirring, resulting unsatisfied appearance of the reconstituted milk beverage.

The invention claimed is:

1. A powder for the preparation of an acidified milk beverage, the powder comprising:
    20-40 wt % fruit juice powder;
    50-70 wt % granular sugar;
    1-2 wt % organic acid granules, all of the organic acid granules in the powder having a diameter from 0.4 mm to 0.7 mm;
    4-10 wt % milk powder; and
    3-4 wt % carboxymethylcellulose powder composed of particles, wherein the particles have a diameter of not greater than 0.1 mm.

2. The powder of claim 1, wherein the granular sugar is selected from the group consisting of sucrose, glucose, maltose, lactose, fructose and combinations thereof.

3. The powder of claim 1, wherein the granular sugar has a particle size of from 0.1 mm to 1 mm.

4. The powder of claim 1, wherein the organic acid is selected from the group consisting of citric acid, lactic acid, malic acid, tartaric acid, and combinations thereof.

5. The powder of claim 1, wherein the organic acid granules comprise citric acid anhydrous type E330.

6. The powder of claim 1, wherein the milk powder is skimmed or non-skimmed milk powder, the milk being selected from the group consisting of cow's milk, goat's milk, soy milk and combinations thereof.

7. The powder of claim 1, wherein the carboxymethylcellulose is Na-carboxymethylcellulose.

8. The powder of claim 1, wherein an acid bite reducing agent is added.

9. The powder of claim 8, wherein the acid bite reducing agent is selected from the group consisting of citrates, bicarbonates, phosphates and combinations thereof.

10. A process of making a milk beverage, the process comprising reconstituting a beverage powder for the preparation of an acidified milk beverage, the beverage powder comprising 20-40 wt % fruit juice powder, 50-70 wt % granular sugar, 1-2 wt % organic acid granules, all of the organic acid granules in the beverage powder having a diameter from 0.4 mm to 0.7 mm, 4-10 wt % milk powder, and 3-4 wt % carboxymethylcellulose powder composed of particles, wherein the particles have a diameter of not greater than 0.1 mm, with a liquid.

11. The process of claim 10, wherein the liquid is selected from the group consisting of water, milk, fruit juice and combinations thereof.

12. The process of claim 10, wherein the beverage has a pH of from 3.8 to 5.2.

13. A process for producing the powder of claim 1 for the preparation of an acidified milk beverage, the process comprising:
- dry blending granular sugar with carboxymethylcellulose powder composed of particles, wherein the particles have a diameter of not greater than 0.1 mm into a blend, and
- mixing a milk powder, a fruit juice powder and granular organic acid to the blend to form the beverage powder, all of the granular organic acid in the beverage powder having a diameter from 0.4 mm to 0.7 mm.

14. The process of claim 13, wherein the granular sugar has a diameter from 0.3 mm to 0.8 mm.

15. The process of claim 13 comprising:
- further admixing an ingredient selected from the group consisting of maltodextrin, flavorants, colorants, vitamins, minerals, fortification agents, emulsifiers, prebiotics, probiotics, fibers and combinations thereof.

* * * * *